April 12, 1966     P. BARATOFF     3,245,646
ALL-DIRECTIONAL SHOCK MOUNT
Filed Nov. 15, 1963
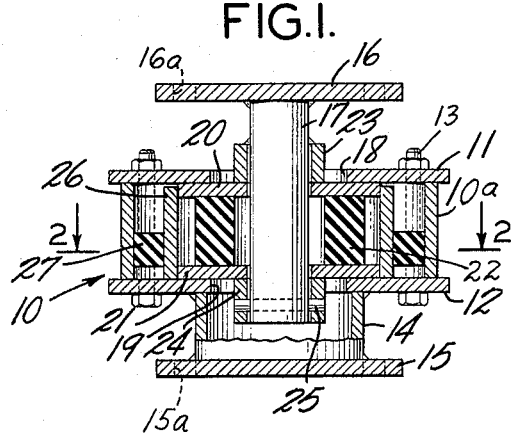
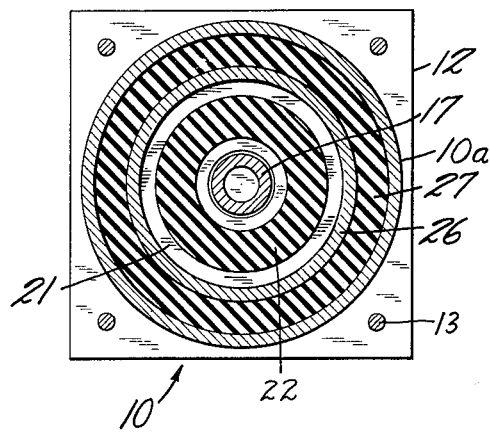
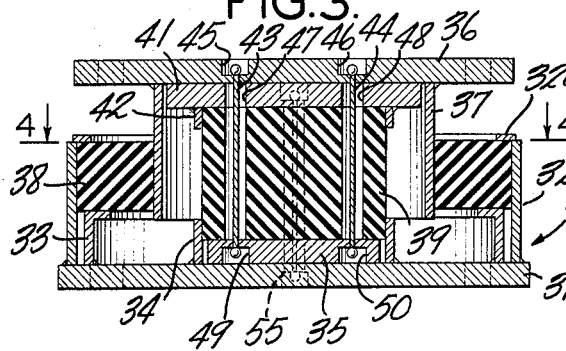
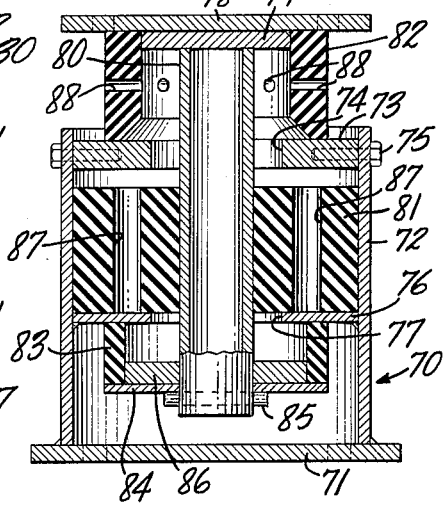
INVENTOR
PAUL BARATOFF
BY
Brumbaugh, Free, Graves & Donohue
HIS ATTORNEYS

3,245,646
ALL-DIRECTIONAL SHOCK MOUNT
Paul Baratoff, Jackson Heights, N.Y., assignor to Korfund Dynamics Corporation, Long Island City, N.Y., a corporation of New York
Filed Nov. 15, 1963, Ser. No. 323,978
3 Claims. (Cl. 248—358)

This invention relates to shock mounts and, in particular, to an improved form of all-directional shock mounts capable of attenuating severe shock forces.

Shock mounts that incorporate shock absorbing members formed of an elastomer or similar resilient material, are often constructed by bonding one or more metallic elements of the mount to the resilient members to enable them to attenuate both compression and tension forces. Bonded compressible elements, limited to the strength of the bond, are inherently incapable of accommodating large tension shock loads. Thus there has existed a need for an all-directional shock mount assembled from conventional resilient members and metal parts which do not require special treatment, such as bonding, and which can accommodate large vertical and horizontal tension and compression forces over long periods.

The present invention satisfies these needs by providing shock mounts that include resilient shock absorbing members disposed to attenuate shock loads from all directions, the displacement of a supported equipment subjecting the members only to compressive forces, and the movements of the equipment additionally being opposed and attenuated not only by internal inherent damping of elastomer material, but also by friction between elements within the shock mount.

More particularly, according to the invention a typical shock mount includes a pair of resilient shock absorbing members formed, for example, of rubber or other elastomer, one of which is subjected to compressive stresses when the supported equipment moves vertically, and the other being partially compressed by movement of the equipment horizontally. Compression of the first shock absorbing member may be effected by means of a pair of plates on its opposite sides, each of the plates being movable in one direction to compress the shock absorbing member between them and attenuate all vertical shock loads. The second shock absorbing member, preferably disposed concentrically with the first shock absorbing member, attenuates all horizontal shock loads.

In one form of the invention the shock absorbing members may be mounted in a housing which slidably and frictionally engages the plates compressing the members, so that shock loads are at least partially attenuated by friction.

For a better understanding of the present invention reference may be had to the accompanying drawings, in which:

FIGURE 1 is a view in vertical section of a shock mount embodying the present invention;

FIGURE 2 is a sectional view of the shock mount shown in FIGURE 1 taken along the line 2—2 of FIGURE 1 looking in the direction of the arrows;

FIGURE 3 is a view in vertical section of another shock mount embodying the invention;

FIGURE 4 is a sectional view taken along the line 4—4 of FIGURE 3 looking in the direction of the arrows; and FIGURE 5 is a view in vertical section of another shock mount embodying the invention.

Referring to a typical embodiment of the invention with reference to FIGURES 1 and 2, a shock mount includes a housing 10 formed by a ring 10a clamped between and concentric with the center of upper and lower aligned plates 11 and 12 secured together by bolts 13. A collar 14, enclosed at its lower end by a base plate 15, is welded to the lower plate 12 to complete the housing 10.

A support or mounting plate 16, to which equipment may be secured for isolation from shock, is welded to a vertically movable shaft 17 extending into the housing 10 through vertically aligned apertures 18 and 19 in the centers of the upper and lower plates 11 and 12. The vertically aligned apertures are of substantially greater diameter than the shaft 17 which protrudes therethrough.

Horizontal annular plates 20 and 21, disposed within the housing 10, are vertically slidable on the shaft 17. Each of the annular plates 20 and 21 has a diameter exceeding the diameter of the apertures 18 and 19, thereby closing the aperture with which it is associated. The annular plates 20 and 21 are spaced vertically from each other by a shock absorbing ring 22 formed of an elastomer such as rubber, for example, compressed between the plates. An upper ring 23 welded to the shaft 17 and a lower ring 24 secured on the opposite end of the shaft 17 by a pin 25, limit the vertical movement of the annular plates 20 and 21 to the portion of the shaft between the rings 23 and 24.

A horizontally slidable collar 26 in the housing 10 engages the peripheries of the annular plates 20 and 21 and rests on the inner surface of the lower plate 12. The slidable collar 26 is spaced from the ring 10a by a closely fitted resilient shock absorbing ring 27 formed of rubber or some other elastomer.

In a typical operation of the shock mount, equipment is fastened to the mounting plate 16 by bolting it through holes 16a and the shock mount secured to a desired base by bolts through holes 15a in the base plate 15. Compressive shock loadings tending to drive the housing 10 upwardly are transmitted from the base plate 15 through the collar 14, the lower plate 12 and the annular plate 21 to the shock absorbing ring 22 where the forces are attenuated. The applied shock loadings compress the annular shock absorbing member 22, which transmit only greatly reduced forces through the annular plate 20, the upper ring 23 and the shaft 17 to the support plate 16.

Forces placing the support plate 16 and the housing 10 in tension are transmitted through the shaft 17, the lower ring 24 and the annular plate 21 to compress the shock absorbing ring 22 against the annular plate 20 and the upper plate 11 of the housing 10, thereby attenuating tension forces.

Horizontal shock loadings are attenuated by the annular shock absorbing member 27 and the frictional forces in the housing 10. Specifically, a horizontal shock force applied to the housing 10 is attenuated between the ring 10a and the shaft 17 by compression through the collar 26 of a portion of the shock absorbing ring 27 and by the frictional forces between the slidable collar 26 and plates 20 and 21 and the plates 11 and 12.

Another shock mount embodying the principles of the present invention, shown in FIGURES 3 and 4, comprises a housing 30 formed by a base plate 31 to which a vertical ring 32 has been welded. Four short angles 33, circumscribed by the ring 32, are welded to the same base plate 31 and also to the ring 32. Concentric with and circumscribed by the ring 32 is an inner lower ring 34, also welded to the base plate 31. A horizontally slidable plate 35 frictionally engages the base plate 31 within the perimeter of the lower ring 34.

A mounting plate 36 adapted to be attached to and support an equipment is vertically spaced above the housing 30. A cylindrical shaft 37 extends downwardly from the support plate 36 and protrudes between the outer ring 32 and the inner lower ring 34. A resilient shock absorbing ring 38, formed of an elastomer such as rubber, is seated on the horizontal legs of the short angles 33 and interposed between the shaft 37 and the ring 32. A plate 32a on the ring 32 retains the annular shock absorbing member 38 in position.

The support plate 36 is spaced from the housing 30 by a shock absorbing cylinder 39 formed, for example, of rubber or some similar elastomer, and resting on a lower plate 35, fits with this plate inside the inner lower ring 34. A slidable horizontal upper plate 41 carries an upper ring 42 which fits over the upper surface of the shock absorbing member 39 with the upper plate 41 interposed between the cylinder 39 and the support plate 36.

A pair of cables 43 and 44, secured at their ends by beading or some similar means in recesses 45 and 46 formed in the support plate 36, extend downwardly from the support plate and through apertures 47 and 48 formed in the upper plate 41 and through the shock absorbing cylinder 39 to recesses 49 and 50 in the lower plate 35, where the cables are similarly secured at their other ends by beading. A companion set of beaded cables 51 and 52 extend in a like manner from recesses in the upper plate 41 through apertures 53 and 54 in the shock absorbing member 39 and through the lower plate to recesses 55 formed in the base plate 31.

In operation, vertical compressive forces imposed between the housing 30 and the support plate 36 are attenuated and absorbed by the elastic shock absorbing member 39. Forces placing the housing 30 and the support plate 36 in tension are also attenuated by compressively stressing the shock absorbing cylinder 39 between the lower plate 35, connected by cables 43 and 44 to the support plate 36, and the upper plate 41, connected by cables 51 and 52 to the base plate 31. Frictional forces generated between the annular shock absorbing member 38 and the shaft 37, due to compression of the member 38 between the ring 32 and the shaft 37, partly dissipate vertical shock input.

Horizontal shock loads are attenuated by the compression of a portion of the annular shock absorbing member 38 between the ring 32 and the shaft 37 and by the sliding friction forces generated by the upper and lower plates 41 and 35 on the support plate 36 and the base plate 31, respectively.

A third shock mount embodying the invention, shown in FIGURE 5, is formed by a housing 70 comprised of a base plate 71 to which is welded a tubular collar 72. A horizontally disposed upper annular plate 73, provided with a centrally disposed aperture 74, is secured to the tubular collar 72 by screws 75. A horizontally disposed lower annular plate 76, formed with a centrally disposed aperture 77, is also secured to the tubular collar 72 and spaced below the upper plate 73 with the apertures 74 and 77 in general alignment to complete the housing 70.

A support plate 78, spaced vertically above the tubular collar 72, carries a smaller plate 79 from which extends a shaft 80. The larger apertures 74 and 77 enable the shaft to protrude through the upper and lower plates 73 and 76 in vertical sliding engagement with an annular shock absorbing member 81 compressively interposed between the shaft 80 and the tubular collar 72 and engaging the lower annular plate 76.

An upper shock absorbing ring 82 is disposed between the support plate 78 and the upper annular plate 73, and fits closely over the plate 79. A lower shock absorbing ring 83 is located between the lower annular plate 76 and a flange 84, attached to the lower extremity of the shaft 80 by means of a pin 85. A plate 86 on the flange 84 fits closely into the ring of elastomer 83 and holds it in position.

Shock forces compressing the base plate 71 toward the support plate 78 are attenuated by the elasticity of the upper shock absorbing member 82, while shock loads placing the support plate 78 and base plate 71 in tension are attenuated by compressing the lower shock absorbing member 83 between the shaft flange 84 and the lower annular plate 76. Partial vertical input dissipation is provided by the frictional forces generated between the shaft 80 and the annular shock absorbing member 81.

Horizontal shock forces are attenuated by the compression of a portion of the annular shock absorbing member 81 between the tubular collar 72 and the shaft 80. The frictional forces generated between the upper and lower shock absorbing members 82 and 83 and the upper and lower annular plates 73 and 76, respectively, provide partial dissipation of horizontal shock inputs.

The load rate of the resilient shock absorbing members in all of the embodiments of the invention shown can be varied to a desired value not only by using elastomers of different hardness, but also by drilling in them a desired number of suitably sized vertical or horizontal holes. For example, in FIGURE 5 a plurality of vertical holes 87 have been drilled in the ring 81 and a plurality of horizontal holes 88 have been formed in the ring 82. The lower edge of the ring 82 has also been partially tapered to afford a desired response to vertical shock loads. Of course the stiffness of the resilient shock absorbing members also affects the load rate of the shock mounts.

As is apparent from the foregoing, the present invention provides an all-directional shock absorbing device in which the imposed shock loadings are attenuated by both elastic compression and friction forces.

It will be understood that while representative embodiments of the present invention have been shown and described for purposes of illustration, modifications thereof will occur to those skilled in the art. Therefore, the invention is not to be limited to the specific apparatus disclosed herein but is to be defined by the appended claims.

I claim:

1. A shock mounting comprising a housing, a support plate spaced vertically from the housing, a shaft extending from the support plate into the housing, a first resilient shock absorbing member in the housing to attenuate vertical shock loads, an upper plate disposed between and engaging the support plate and the first resilient member, a lower plate disposed between and engaging the housing and the first resilient member, first cable means connecting the lower plate to the support plate, second cable means connecting the upper plate to the housing, whereby the first resilient shock absorbing member attenuates by compression thereof all vertical shock loads between the support plate and the housing, and a second resilient shock absorbing member comprising a ring effectively interposed between and engaging the shaft and the housing to attenuate by compression thereof all horizontal shock loads between the shaft and the housing.

2. A shock mount as defined in claim 1, wherein the resilient shock absorbing ring frictionally engages the shaft to attenuate vertical shock loads.

3. A shock mount as defined in claim 1, wherein the upper plate frictionally engages the support plate to attenuate horizontal shock loads.

References Cited by the Examiner

UNITED STATES PATENTS

| | | | |
|---|---|---|---|
| 1,820,220 | 8/1931 | Geyer | 248—358 |
| 2,376,317 | 5/1945 | Wallerstein | 248—358 |
| 2,660,386 | 11/1953 | Munro | 248—21 |
| 2,942,834 | 6/1960 | Clark | 248—358 |
| 3,145,012 | 8/1964 | Kfoury | 248—358 |

FOREIGN PATENTS 1,014,046  5/1952  France.

CLAUDE A. LE ROY, *Primary Examiner.*

F. L. ABBOTT, J. PETO, *Assistant Examiners.*